United States Patent [19]

Eapen et al.

[11] 3,732,108

[45] May 8, 1973

[54] RECOVERY OF AND SEED MEAT FROM THIOGLUCOSIDE-CONTAINING OILSEED

[75] Inventors: Kuttikandathil Eapen Eapen, Staten Island, N.Y.; Norman Wilson Tape, Richard Paul Andrew Sims, both of Ottawa, Ontario, Canada

[73] Assignee: Canadian Patents and Development Limited, Ottawa, Ontario, Canada

[22] Filed: Dec. 17, 1971

[21] Appl. No.: 209,240

Related U.S. Application Data

[63] Continuation-in-part of Ser. No. 805,619, March 10, 1969, abandoned.

[52] U.S. Cl. .................... 99/2 E, 99/17, 260/210 R, 260/412.2, 260/412.4
[51] Int. Cl. ............................................. A23l 1/20
[58] Field of Search ........................... 99/2 R, 2 E, 17, 99/150; 260/412.2, 412.4, 123.5, 210; 195/121

[56] References Cited

UNITED STATES PATENTS

| | | | |
|---|---|---|---|
| 3,391,000 | 7/1968 | Mustakas et al. | 99/2 |
| 3,044,876 | 7/1962 | Goering | 99/2 |
| 3,615,648 | 10/1971 | Barros | 99/2 |
| 3,574,640 | 4/1971 | Dougherty | 99/2 |

OTHER PUBLICATIONS

G. C. Mustakas et al, The J. of the Amer. Oil Chem. Soc., August, 1962, Vol. 39, No. 8 pp. 372–377.
K. E. Eapen et al, J. of the Amer. Oil Chem. Soc., Vol. 45, March, 1968, pp. 194–196.

Primary Examiner—Norman Yudkoff
Assistant Examiner—Curtis P. Ribando
Attorney—Arnold B. Christen et al.

[57] ABSTRACT

There is described a process for obtaining protein-rich, substantially non-toxic, oilseed flour by subjecting certain oilseed to myrosinase inactivating temperatures in the presence of water, myrosinase being the enzyme responsible for liberation of toxic compounds upon enzymatic hydrolysis. The water-treated seeds are subjected to decortication so as to expose the seed meat, thioglucoside is substantially removed by extracting at least the exposed seed meat with cold or warm water, the water-extracted material is dried and oil is recovered. The process is particularly applicable to rapeseed and other related seeds and provides a protein-rich flour, suitable for human consumption or animal feeding, which may have a protein content of up to about 56–62 percent, rapeseed oil and, as a by-product, a seed coat rich meal which is useful for animal feeds.

10 Claims, 1 Drawing Figure

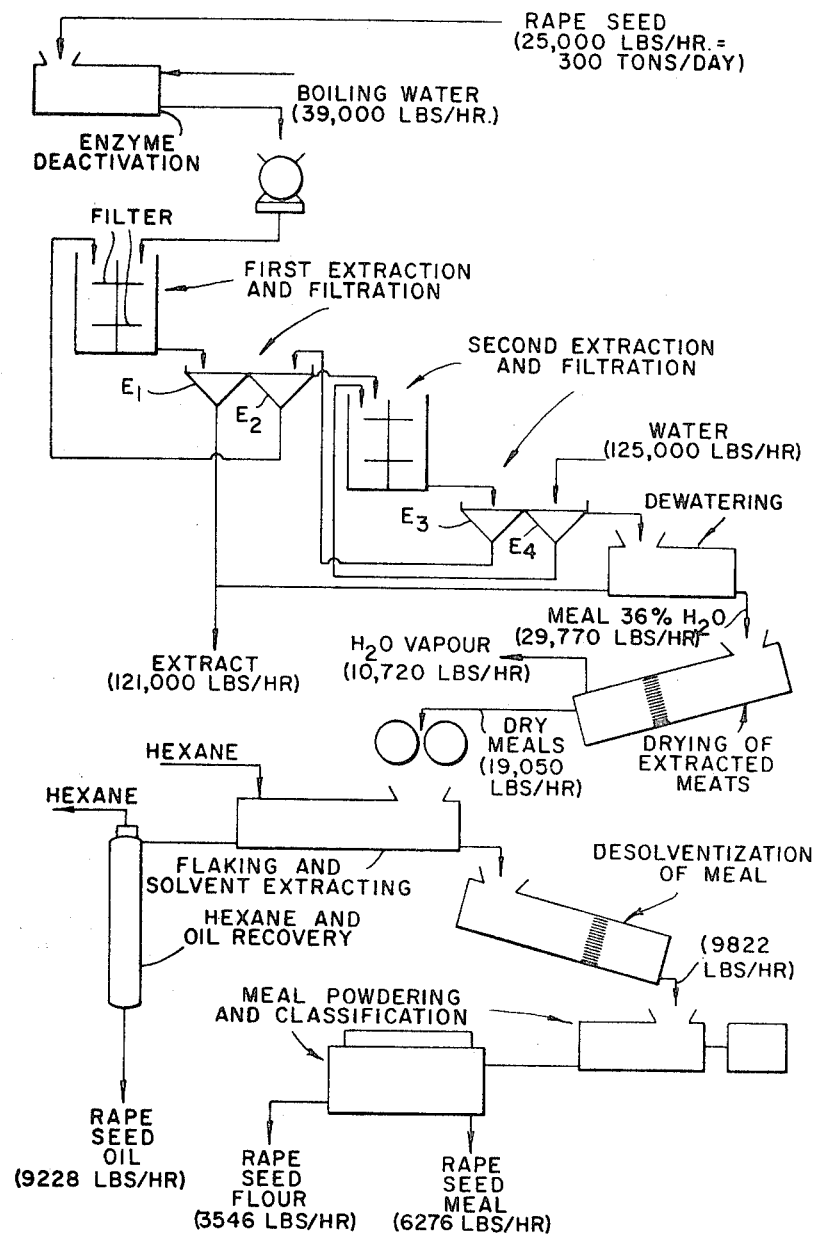

RECOVERY OF AND SEED MEAT FROM THIOGLUCOSIDE-CONTAINING OILSEED

This application is a continuation-in-part application of our copending application Ser. No. 805,619, filed on Mar. 10, 1969 and now abandoned.

BACKGROUND OF THE INVENTION

Oilseed meal as a rich source of protein is attracting greater attention now than at any other time in the past. Advances in food technology have made it possible to produce meat and diary product extenders and substitutes from oilseed meals. Rapeseed ranks fifth in the world production of oilseeds, but the utilization of rapeseed meal as protein source has been limited due mainly to its content of thioglucosides which liberate toxic isothiocyanates and oxazolidinethione upon enzymatic hydrolysis. Destruction of myrosinase, the enzyme responsible for the liberation of the toxic compounds, permits the use of rapeseed meal in the feed rations of livestock and poultry at levels up to 10 percent. No attempt has yet been made to utilize rapeseed meal as a protein source in human food formulations due to the possibility of recontamination with myrosinase, the presence of black hulls and a dark color which render it aesthetically unattractive, and a fiber content in commercial meal of 12–14 percent.

A number of methods for detoxifying rapeseed have been tried, including autoclaving, steam stripping, chemical modification and aqueous extraction. Autoclaving or steam-stripping is reported to result in the disappearance of about 90 percent of the oxazolidinethione. However, in studies designed to assess the nutritional value of the protein in rapeseed meal treated in this manner, there has been observed a progressive deterioration in protein quality as the time of heat treatment was extended.

In one chemical modification, the thioglucosides are catalytically decomposed by heating with salts of iron, copper or nickel followed by steam stripping. Of the decomposition products, the toxic 1-cyano-2-hydroxy-3-butene remains in the meal as it is not steam volatile. Simple aqueous extraction of rapeseed meal to remove the thioglucosides has been reported to result in an end product which is more toxic than the original material.

It is believed that the only attempt which has been made to solve the problem of the removal of the black fibrous seed coat has been to grind and screen the rapeseed meal, thereby producing a series of fractions of varying seed coat content.

SUMMARY OF THE INVENTION

We have now discovered a sequence of steps which enables the production from oilseeds of a white to cream-colored, bland, substantially non-toxic defatted flour suitable for human consumption, together with a by-product meal which is useful for animal feeds, and a superior quality of oil.

The process of this invention has particular application to the treatment of rapeseed, but may also be used with mustard, crambe and other similar seeds.

The rapeseed protein-rich flour produced by the process may have a protein content of up to about 56 to 62 percent (as compared to commercial meal which has a protein content of about 36 percent), while the by-product seed coat protein-poor meal may have a protein content of 25 to 45 percent, which may be further increased by altering classification conditions or by addition of some flour.

According to the present invention, there is provided a method for treating thioglucoside-containing oilseed to produce a substantially non-toxic, proteinaceous product which comprises the steps of subjecting the oilseed to a myrosinase-inactivating temperature of at least 85°C in the presence of water and to a decorticating step so as to expose the seed meat while avoiding undue disintegration of the seed meat, removing thioglucoside by subjecting at least the seed meat to liquid phase extraction with water at a temperature not above 60°C; and recovering both oil and dry, substantially thioglucoside-free seed meat.

The FIGURE is a flow diagram of the procedure of the example.

The myrosinase-inactivating water treatment is usually best accomplished by soaking the seeds in hot water at 85°C or more for about 0.5 – 5 minutes, preferably 1 – 4 minutes, but temperature, pressure and the length of time during which the oil seeds are treated can be varied in any way which will effect the inactivation of the enzyme myrosinase. The treatment conditions may be conducted so as to loosen the seed coat, but should not be so severe as to cause undue disintegration of the seed meat, thereby causing loss of solids during water-extraction and hindering later filtration, or so severe as to cause discoloration of the oil therein. It has been found preferable to cool the seeds promptly after the hot water treatment such as by water-spraying, which can be accomplished during the following decorticating step.

Before or after enzyme inactivation the seeds are subjected to a decorticating step so as to expose the seed meat and preferably to free the seed meat for occulsion by the seed coat or hull. Squeezing or crushing, e.g., in a vertical plate grinder with a stream of water, is preferred but conditions for decorticating the seeds should be chosen so as to result in a minimum of "-fines" (formation of fine particles which tend to clog filters such as may be used following the next or in oil recovery by means of solvent extraction) a problem encountered in the commercial solvent extraction of oilseeds. For example, an enzyme-deactivated rapeseed meat-hull mixture, after grinding in this manner and followed by the consecutive steps of aqueous extraction, drying, flaking, oil extraction and air classification into two fractions, resulted in a protein-rich meats fraction essentially free of seed coat, and a hull fraction containing some powdered meats, the mesh size of each depending on market requirements, the latter fraction being more or less protein-poor. The analysis of the products are presented in Table I, below.

TABLE I - AIR CLASSIFICATION OF DETOXIFIED RAPESEED MEAL (ECHO VARIETY OF B. CAMPESTRIS)

| -I- | Meats fraction | Seed coat fraction |
|---|---|---|
| Percent of original raw Material * | 43.9 | 28.8 |
| Percent protein content* | 59.7 | 33.7 |
| Percent fiber | 10.1 | 26.5 |
| Appearance | White to creamy white -Powdery | Grey-Powdery |

* Moisture- and oil-free basis

The above data shows that nearly 44 percent of the raw material (moisture- and oil-free basis) was separated as a nearly white powder. This was bland in taste and contained about 60 percent protein, a protein content which is substantially higher than that heretofore obtained. The by-product seed coat or hull fraction, also free of the thioglucosides, is grey in color and contains about 33 percent protein and can be used as an animal feed.

The step of aqueous extraction of the exposed seed meat or preferably of the mixture of meat and detached seed coat is preferably conducted so that substantially all of the thioglucoside and coloring matter is removed, and thus the number and type of extractions, the temperature of the water and time of extraction will to some extend depend on the type of variety of thioglucoside-containing oilseed used. Thus, extraction may be carried out batchwise or using continuous extraction and filtration equipment. In batch operation, 1 to 4 extractions, preferably 2 to 4, at a seed to water ratio of 1:4 to 1:15, has been found to be effective in acheiving the desired result, and water temperatures ranging from ambient temperature to 60°C have been found to be satisfactory. On a large scale, room temperature continuous counter-current aqueous extraction may be used.

For efficient leaching, it is desirable to obtain maximum removal of thioglucoside in the first extraction, thereby keeping to a minimum the number of extractions. As stated above, the conditions used will depend on the best method of obtaining this end with the particular oilseed being leached. For instance, to determine the optimum time for an extraction one hundred parts by weight of enzyme-inactivated, decorticated rapeseed were stirred in a planetary mixer with four hundred parts of water at room temperature for 15, 30, 45 and 60 minutes respectively in different tests and, in each case, the extract separated by filtration on an 80 mesh sieve and analyzed for total solids, thioglucosides, protein and oil content, the values shown in Table II below were obtained.

TABLE II

EFFECT OF CONTACT TIME ON AMBIENT TEMPERATURE EXTRACTION, 1:4 SEED TO WATER RATIO

| Agitation time min | Total solids in extract %* | Percent of total Thioglucoside in extract | Oil in extract | Protein in extract |
|---|---|---|---|---|
| 15 | 2.9 | 57.4 | 3.07 | 9.0 |
| 30 | 3.3 | 75.3 | 3.48 | 10.8 |
| 45 | 3.5 | 78.4 | 3.72 | 12.3 |
| 60 | 3.6 | 83.5 | 4.23 | 14.0 |

* In the above table and hereafter, it should be understood that the total solid content of the extract was determined by drying a known weight of the extract in a Petri dish. The remainder of the extract was freeze dried and used for the analysis of the protein, oil and glucosides. Protein was estimated colorimetrically. Oil content of the freeze-dried solids was estimated by Soxhlet extraction with petroleum ether. For the estimation of thioglucosides, samples were shaken with myrosinase solution prepared with phosphate-citrate buffer of pH 7.0. The liberated isothiocyanate and oxazolidinethione were estimated by gas chromatography and spectrophotometrically respectively. The percentage of the different constituents in the extract were calculated from the total solid content value.

The above data shows that nearly 75 percent of the total thioglucosides dissolves in the first 30 min. period of extraction and that doubling of extraction time does not appreciably increase the amount dissolved. The above data also shows that, with the increase in extraction time, protein content in the extract increased from 9 - 14 percent, while the oil content was fairly constant.

Then, to determine the optimum number of extractions for efficient leaching, the following typical four-stage water extraction step using rapeseed meats was carried out:

One hundred parts by weight of rapeseed were crushed as described above and mixed in a planetary mixer with four hundred parts of water for 30 min. at room temperature. The extract was then separated by filtration on an 80 mesh sieve and the residue re-extracted three times in the same manner. The four extracts and the final residue were weighed and freeze-dried separately and estimated for total thioglucoside, protein and oil contents. The extraction data and the analytical data are presented in Table III and Table IV, below.

Data in Table III shows that 25-35 percent of the total extract remains with the crushed rapeseed at different stages of extraction with the apparatus used. A liquid hold-up of 25-35 percent in the residue was felt to be rather high for efficient extraction of the thioglucoside and a figure of 10 percent liquid hold-up was chosen as a more desirable percentage for larger scale work with this type of apparatus. It was then calculated that a raw material to water ratio of 1:15 would be necessary to reduce the liquid hold-up of 10 percent of the total extract with this system. The thioglucoside solubility data presented in Table III show that about 76 percent of the thioglucoside has gone into solution during the first stage of extraction. Material balance figures given in Table IV show a yield of 85 percent of the raw material with nearly 85 percent and 97 percent respectively of total protein and oil.

Table III

Extraction data of 1:4 seed to water ratio, ambient temperature

| Extraction stage | % raw material in extract phase | % total thioglucoside in extract | Total solid content of extract % | Water holdup on residue % |
|---|---|---|---|---|
| First stage | 12.48 | 76.7 | 3.16 | 35.0 |
| Second stage | 1.40 | 9.3 | 1.07 | 27.3 |
| Third stage | 0.63 | 5.9 | 0.41 | 25.8 |
| Fourth stage | 0.44 | 1.7 | 0.19 | 27.8 |
| Total | 14.95 | 93.6 | | |

The water hold-up can be decreased by the use of more efficient filter and filter wash equipment.

Table IV

Material balance data on 1:4 seed to water ratio, ambient temperature.

| | Percent of total | | | |
|---|---|---|---|---|
| | Thioglucoside | Protein | Oil | solids |
| Removed in first extract | 49.8 | 8.12 | 1.55 | 8.10 |
| Removed in second extract | 26.0 | 4.3 | 0.83 | 4.2 |
| Removed in third extract | 11.8 | 1.5 | 0.36 | 1.7 |
| Removed in fourth extract | 4.3 | 0.7 | 0.18 | 0.7 |
| Remaining in end product | 5.2 | 85.4 | 97.00 | 85.00 |
| | 97.1 | 100.0 | 99.92 | 99.7 |

As previously stated, the temperature at which aqueous extraction takes place will also affect the degree of efficiency with which substantially all of the thioglucosides are leached from the exposed seed meat or the mixture of meat and detached seed coat. For example, one hundred parts by weight of enzyme-inactivated, decorticated rapeseed was extracted with four hundred parts of water at 25°, 40°, and 60°C. respectively in different tests, and in each case, the temperature was maintained constant throughout the 30 min. extraction period, and the extract was separated by filtration on a 80 mesh sieve and analyzed, the values for solids, protein, oil and thioglucosides given in Table V, below were obtained.

Table V

Effect of Temperature on Extraction, 1:4 seed to water ratio

| Temperature of extraction (C) | Percent of total | | | |
|---|---|---|---|---|
| | Raw material in extract | Protein in extract | Oil in extract | Thioglucoside in extract |
| 25 | 12.5 | 12.5 | 2.42 | 76.7 |
| 40 | 14.4 | 16.6 | 3.86 | 85.4 |
| 60 | 15.2 | 17.5 | 3.83 | 88.5 |

Thus from the above table it can be seen that the amount of protein and oil in the extract increases more markedly with increase in temperature than the amount of thioglucoside, so that it is preferred to extract at a relatively low temperature, using sufficient extraction stages to accomplish the desired degree of thioglucoside removal. Furthermore, cold water extraction is preferred due to the obvious lower operational costs. Increasing the temperature above 60°C did not result in any significant increase in the thioglucosides extracted, but on the other hand had the disadvantage of resulting in appreciably greater protein losses.

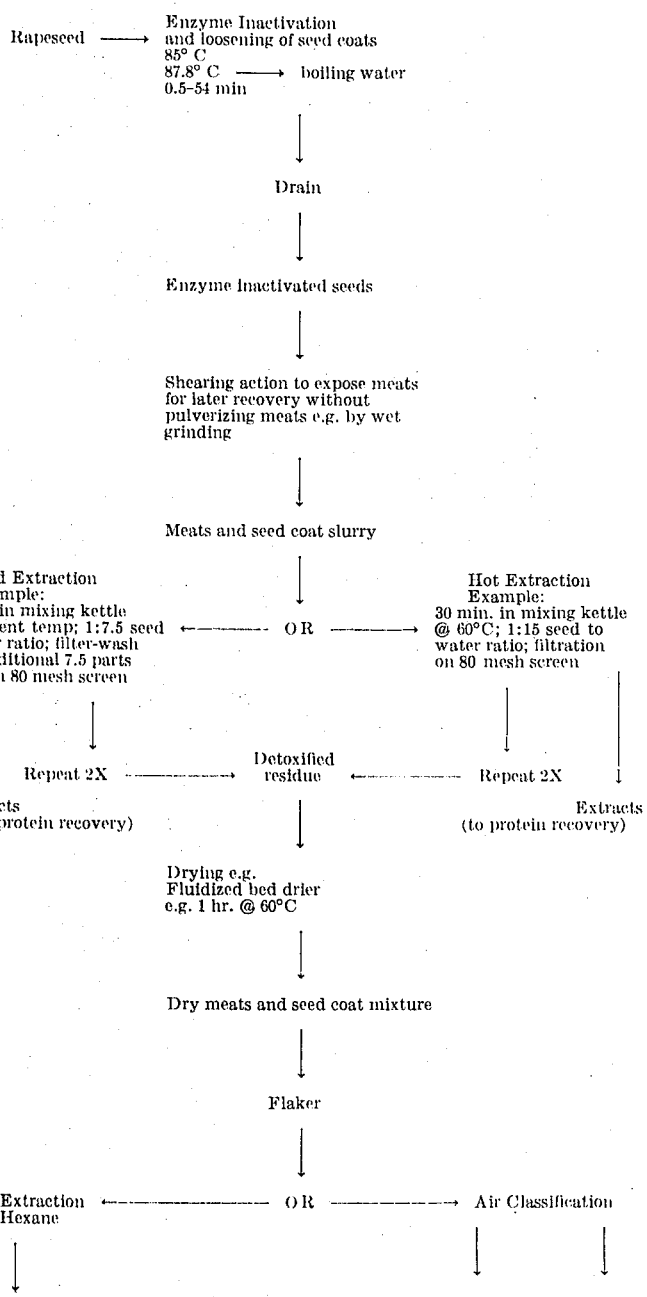

Flow sheet for preparation of oil, flour and meal from rapeseed

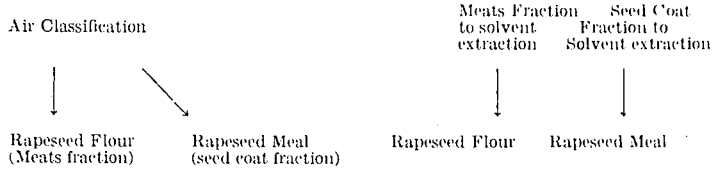

A most important step in the process of the present invention is the oil recovery step, this product being of great commercial value. This is usually effected by conventional pressing or solvent extraction operations or a combination of pre-pressing with solvent extraction. Oil recovery can, physically, be carried out even before seed coat separation or prior to aqueous extraction by solvent extraction since the thioglucosides are insoluble in most of the usual solvents, especially the particularly preferred solvent hexane. However, this is most undesirable due to the probability of catalysts used during any hydrogenation of the recovered oil being poisoned by even small amounts of thio-compounds. This catalyst poisoning is essentially eliminated when the aqueous extraction of the exposed meats or the mixture of the meats and free hulls is carried out before oil recovery, and a superior quality of oil is also obtained in this way, being lighter in color and more easily hydrogenated than oils which are presently obtainable. Thus, for example, rapeseed oil obtained in this manner (A) was compared with a rapeseed oil prepared in the conventional manner from the same batch of rapeseeds (B) and also compared with a commercial rapeseed oil. The refined, bleached oils were each hydrogenated at 400°F, 5 psig, and 0.25 percent catalyst (containing 25 percent Ni), the hydrogenation being allowed to run for one hour. The results are set out in Table VI, below.

Table VI

Comparison of Rapeseed Oils

| Measurement | Solid Fat Index | | |
|---|---|---|---|
| Temperature °C | A (Iodine Value 38.9) | B (Iodine Value 76.6) | Commercial Oil (Iodine Value 69.6) |
| 10.0 | | 43.9 | 59.0 |
| 21.1 | Too Hard | 25.2 | 43.1 |
| 26.7 | for | 15.7 | 34.2 |
| 33.3 | determination | 3,3 | 16.4 |
| 40.0 | | 0 | 1.5 |

As shown in Table I, the detoxified seed meats fraction prepared in accordance with this invention (in which oil extraction follows the thioglucoside extraction by water) is white to creamy-white in color. On the other hand, if the aqueous thioglucoside extraction step follows the oil extraction step, not only is the oil inferior, as shown above, but the seed meats fraction is discolored, decreasing the value, at least esthetically of this material for human food. This is illustrated in the following flow sheet.

Flaked meats fraction from enzyme inactivated (Water at 100°C for 2 mins)

B Campestris (variety-echo)
↓
Oil removal
↓
(Solvent extraction with petroleum ether B.P. 30°-60 °C)
↓
Thioglucoside removal
↓
(3 stages of aqueous extraction at 60°C)
↓
Filter and dry
↓
Product - Color : Brown Moisture: 11.3%

Oil : 2%

The particularly preferred method for carrying out the process of the present invention consists of soaking oilseed in water at 85°C or more for a period ranging from 1 – 4 minutes, according to the variety and quantity of seed used, separating the seeds from the boiling water and cooling the seeds, usually with a cold-water spray during the next step. These operations quickly destroy the enzyme myrosinase and loosen the seed coat. They also help to reduce "fines" formation on crushing or grinding, as hereinbefore explained. After wet grinding, using a vertical plate grinder with a stream of water, the seed meat is exposed and free from occulsion by the seed coat. The mixture is extracted with water (preferably two or more times) and drained or filtered to remove the thioglucosides. Depending on the variety of the seed used and the quality of the finished product desired, the seed to water ratio varies from 1:4 to 1:15 and batch extraction stages from 1 to 4, preferably 2 to 4. A temperature range of cold or ambient temperature to 60°C is employed with water at ambient temperature being particularly preferred. The extracted material is dried in an air-drier, using a fluidized bed drier (at a dry bulb temperature of up to 60°C), reducing the moisture content to less than 5 percent and preferably 2 to 2.5 percent. The dried material is then flaked. The oil is extracted from the flaked material by conventional solvent extraction using hexane, for example, or by conventional pre-press solvent operations. Before oil recovery the flaked material may be further comminuted and classified into a protein-rich fraction consisting essentially of the seed meats and a protein-poor fraction essentially consisting of the seed coats and some meats. The resultant oil-depleted product is ground (e.g. with an attrition mill), and air-classified to separate the meat from the hulls, if not done previously, resulting in a protein-rich fraction of suitable 200 mesh size and a protein-poor fraction of larger average particle size. Particles size of these products may be varied to suit intended market use. The meat fraction may be used for human nutrition and the hull fraction for animal nutrition, such as livestock and poultry feed.

The following is an example of the process of the present invention.

EXAMPLE 25,000 lbs. of rapeseed per hour (or 300 tons/day), when processed as indicated in the following flow diagram, FIG. 1, give the quantities of oil, flour, and meal indicated in the diagram. 3,546 lbs. flour are obtained, having a protein content of about 60 percent, while 6,276 lbs. of meal are obtained, having a protein content of 42–44 percent. As previously stated, the classification conditions can be readily adjusted so that the weight of flour obtained to the weight of meal obtained is 50:50, in which case the protein content of the meal will drop to about 32 percent.

The remarkable protein quality of the flour and by-product meal of the present invention can be readily demonstrated by a comparison of Protein Efficiency Ratios (PER) with those values obtained for present commercial sources of protein in animal foods. The flour and meal obtained by the process of the present invention gave PER values of 2.5–3.0 and 2–2.5, respectively, compared to a PER of 2.5 for commercial casein-containing products (the usual standard when making this comparison), and a PER of around 2.0 for the usual commercial oilseed meals.

Present indications are that the protein-rich, white-creamy, bland, rapeseed flour can be used in food formulation for human consumption, since animal tests have revealed no toxicity, while the seed coat rich meal is also substantially non-toxic and, although more or less protein-poor, is sufficiently rich in protein to be used as a livestock and poultry feed.

What we claim as our invention is:

1. A method for treating thioglucoside - containing oilseed selected from rape, mustard, and crambe seeds, which comprises the steps of
   a. subjecting the oil-containing oilseed to a myrosinase-inactivating temperature of at least 85°C in the presence of water for about 0.5–5.0 minutes, and to a decorticating step to expose the seed meat while avoiding undue disintegration of the seed meat;
   b. removing thioglucoside by subjecting at least the seed meat to extraction with water in the liquid phase at a temperature not above 60°C; and
   c. recovering both oil and dry thioglucoside-free seed meat material from the product of step (b).

2. A method as claimed in claim 1 wherein the myrosinase-inactivation treatment is conducted for a time sufficient to loosen the seed coat, and wherein the decortication step is conducted by subjecting the so treated seed to a shearing action to expose the seed meat while minimizing the production of fines thereof.

3. A method as claimed in claim 1 wherein step (b) is effected at about ambient temperature.

4. A method as claimed in claim 1 wherein step (c) is carried out by first drying the water-extracted seed meat and thereafter recovering oil therefrom.

5. A method as claimed in claim 1 wherein in step (b) both the seed meat and the seed coat are subjected to extraction with water; wherein in step (c) the mixture of seed meat and seed coat is dried and subjected to oil recovery; and wherein the mixture thereafter is subjected to classification to produce a seed meat fraction and seed coat fraction.

6. A method as claimed in claim 5 wherein the seed meat fraction is ground and screened to produce a fine flour, and wherein coarse residue left after screening is combined with the seed coat fraction.

7. A method as claimed in claim 1 wherein the oilseed is rapeseed.

8. A method as claimed in claim 7 wherein step (a) conducted by subjecting the oilseed to treatment with boiling water until the seed coat is loosened, and then passing the seed so obtained through a vertical plate grinder in a stream of water; and step (b) is conducted by subjecting the mixture so obtained to at least two successive extractions with cold to ambient temperature water to remove substantially all of the thioglucoside contained therein.

9. A method as claimed in claim 8 wherein the water-extracted mixture from step (c) is dried, flaked and subjected to solvent extraction to remove the oil, and wherein the oil-free meal is then thereby comminuted and classified into a protein-rich seed meat fraction, and a protein-poor fraction consisting essentially of seed coats containing a minor proportion of seed meat.

10. A method as claimed in claim 9 wherein the protein-rich seed meat fraction is ground to produce rapeseed flour suitable for human consumption.

* * * * *